(No Model.)

J. A. THOMPSON.
HARNESS.

No. 527,904. Patented Oct. 23, 1894.

Witnesses:
J. A. Cantin
Arthur B. Jenkins

Inventor:
Jonas A. Thompson,
by Chas. L. Burdett,
Attorney

UNITED STATES PATENT OFFICE.

JONAS A. THOMPSON, OF SUFFIELD, CONNECTICUT.

HARNESS.

SPECIFICATION forming part of Letters Patent No. 527,904, dated October 23, 1894.

Application filed June 30, 1894. Serial No. 516,163. (No model.)

*To all whom it may concern:*

Be it known that I, JONAS A. THOMPSON, a citizen of the United States, and a resident of Suffield, in the county of Hartford and State of Connecticut, have invented certain new and useful Improvements in Training-Harnesses, of which the following is a full, clear, and exact description, whereby any one skilled in the art can make and use the same.

The object of my invention is to provide a harness or harness attachment device that is particularly adapted for use in training and speeding horses and which will not cause sore places and raws such as are common to the use of the old kinds of harness, and which will permit a freer action or movement of the horse while preventing accidents liable to occur when a horse breaks in his gait.

To this end my invention consists in the details of the several parts making up the attachment and the harness as a whole and in the combination of such parts as more particularly hereinafter described and pointed out in the claims.

Figure 1:
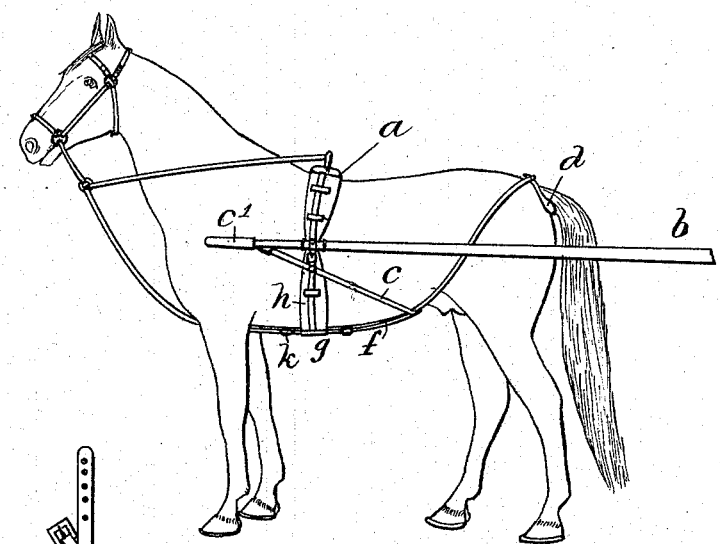
Figure 2:
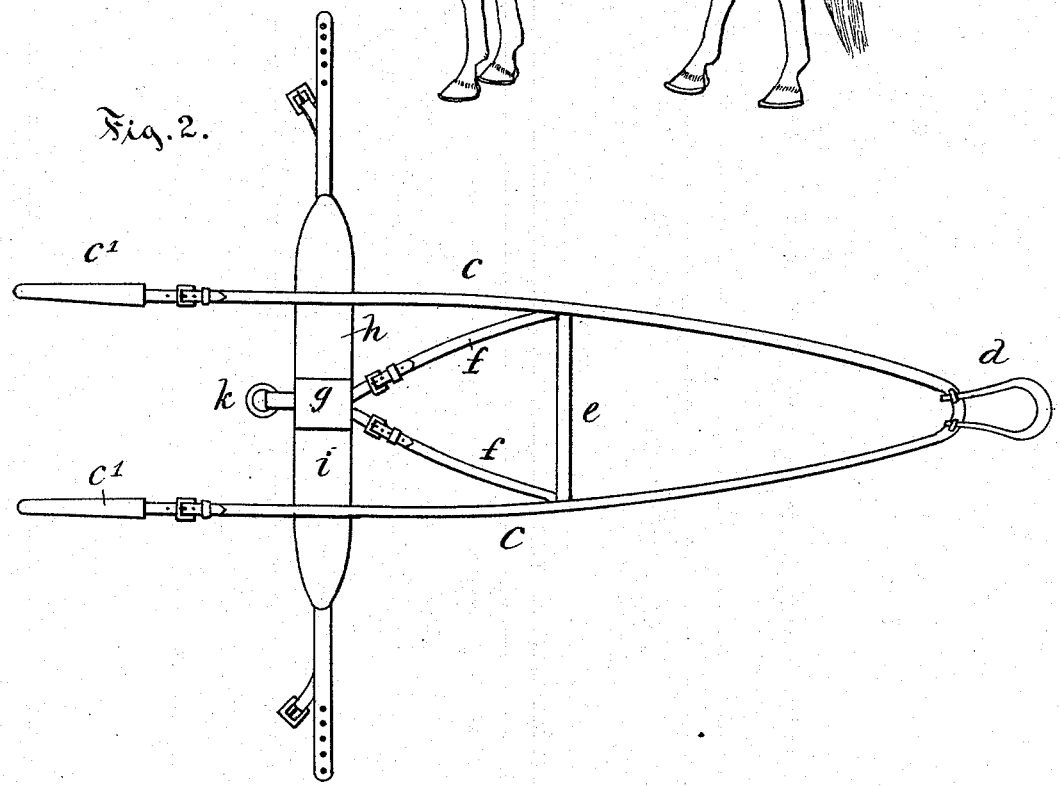

Referring to the drawings: Figure 1 is a view of a horse equipped with my improved harness. Fig. 2 is a diagram or plan view of the harness with parts cut away to show construction.

A common form of harness for a horse includes a breast strap and breeching and these parts in use tend to restrict the movement of the horse preventing particularly a free movement of the hind legs, and they are further objectionable for the reason that they are likely to chafe the horse and cause raws at various points where these parts lie against the body of the horse.

My improved attachment and harness excludes a breeching and a breast strap and is so located on the body of the horse as to hold the shafts of a wagon or sulky in a firmer manner than is possible with prior harnesses.

In the accompanying drawings the letter $a$ denotes a saddle which may be of any ordinary construction and having straps by means of which the shafts $b$ are in part supported.

The letter $c$ denotes a stay or main strap which extends from the point of the shafts on each side of the horse, underneath the body of the horse and then extends upward and passes over and across the hips and over the back at the root of the tail where it is secured to a crupper $d$. This stay is preferably united below the body of the horse by a stay $e$, girth straps $f$ extending from the stay or main strap forward to a girth socket $g$. To the girth socket is secured a girth $h$ and it is preferably provided with a pad $i$, the girth $h$ having near its opposite ends buckles or like means for securing the girth to the shaft $b$ as by wrapping the end of the girth several times about the shaft and then passing the end through the buckle and into a tuck in the ordinary manner of fastening.

The forward ends of the stay or main part of the harness attachment are provided preferably with shaft sockets $c'$ and these are preferably adjustably secured to the end of the main strap as by means of a buckle so as to adapt the harness to horses of various sizes. In the same manner the ends of the girth straps are secured to the girth or to the girth socket by a buckle and strap device so as to make the attachment as a whole adjustable to horses of various sizes.

The girth socket $g$ of the girth is provided with a ring $k$ to which a martingale strap may be secured.

The main feature of the harness or attachment consists of the main strap $c$ with the shaft sockets $c'$ and the crupper or like device $d$, such strap extending from the ends of the shaft down underneath the horse and up over the back near the root of the tail. As shown in Fig. 1 of the drawings this arrangement of the main strap holds the shaft securely against any forward sliding movement along the side of the horse. It is secured to the girth and the latter to the shafts and these combined with the saddle serve to hold the shafts of a light wagon or racing sulky firmly in place and will permit a perfect freedom of movement to the horse. There is no breast strap to extend across the muscles of the forelegs and to chafe the animal, and the breeching is dispensed with, the portion of the main strap extending up and across the back doing so in a manner which leaves the hind legs free to move, and as shown by experiment and test not only avoids fretting a horse but enables greater speed to be made owing to the freedom of action allowed.

When a horse is harnessed to a sulky or wagon by the harness as shown, and the driver pulls back upon the reins thrusting at the same time against the shafts or upon the floor of the wagon the tendency will be to push the shafts forward along the side of the horse, but this is resisted by the strap, the sockets on the end of which engage the end of the shaft. The location of the main strap over the horse's back near the tail tends to hold the horse to his gait in a trot and prevents breaking.

The harness is particularly useful in connection with the new style of racing sulky provided with bicycle wheels and pneumatic tires, as such a sulky used with the old form of harness is twisted when the driver saws on the rein to get the horse back into his gait after breaking, as by pulling back on the horse, the front ends of the shaft lift and the wheels run under throwing the driver out of the sulky. My improved harness prevents any accident of this kind as the points of the shaft are prevented from rising and a firmer attachment of the shaft is provided. The apparatus also prevents the chafing by the saddle which is in the old form of harness caused by the forward sliding movement of the shaft rocking the saddle and carrying its back edge down upon the back of the animal when the horse is pulled. All such forward sliding movement of the shaft is prevented by connection with the main strap as described.

The device as a whole is used preferably as a complete harness although it may be used in connection with the old harness which includes a breast strap and breeching, although the need of these parts is completely obviated by the use of the strap as described.

I claim as my invention—

1. In a harness, a saddle or girth in combination with a main strap provided at the front ends with means for attachment to the front ends of the shaft, a crupper attached to the rear portion of the main strap, the said main strap connected to the girth and being adapted to extend from the crupper downwardly to the girth and then upwardly to the shafts, all substantially as described.

2. In combination, the vehicle shafts $b$, a saddle $a$, a girth $h$, a main strap $c$, a crupper $d$ attached to the main strap, girth straps $f$ connecting the main strap to the girth, the said main strap adapted to extend from the crupper downwardly to the point of attachment to the girth, and upwardly to the shafts, and means for attaching the shafts to the girth and to the main strap, all substantially as described.

3. In a harness, in combination, a saddle, a girth, straps for attaching the shafts of a vehicle to the girth, a main strap, a stay connecting the side parts of the main strap, a crupper attached to the upper and rear portion of the strap, girth straps adjustably connecting the main strap and the girth socket, the girth socket, and the shaft sockets adjustably secured to each front end of the main strap, said main strap adapted to extend from the crupper downwardly to the point of attachment to the girth and then upwardly to the shaft, all substantially as described.

JONAS A. THOMPSON.

Witnesses:
CHAS. L. BURDETT,
ARTHUR B. JENKINS.